C. JAEK.
METHOD OF MANUFACTURING PRINTING ROLLERS.
APPLICATION FILED OCT. 22, 1908.
970,830.
Patented Sept. 20, 1910.
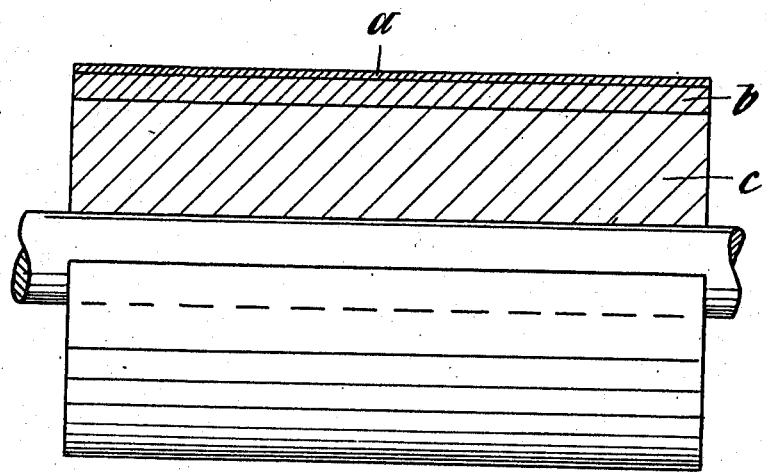
WITNESSES
W. P. Burke
A. F. Heuman
INVENTOR
Carl Jaek

UNITED STATES PATENT OFFICE.

CARL JAEK, OF BERLIN, GERMANY.

METHOD OF MANUFACTURING PRINTING-ROLLERS.

970,830.

Specification of Letters Patent. Patented Sept. 20, 1910.

Application filed October 22, 1908. Serial No. 459,054.

*To all whom it may concern:*

Be it known that I, CARL JAEK, subject of the Kingdom of Prussia, residing at 12, 13 Wöhlerstasse, Berlin, Germany, have invented new and useful Improvements in the Method of Manufacturing Printing-Rollers, of which the following is a specification.

Press-rollers of composition-stone for lithographic printing are already known. Stone of this nature is, however not adapted for use in the printing of wall-paper, wax-cloth or linoleum, as these materials require other properties in the roller than are displayed in lithography. In the first place such press-rollers must be so constructed that their surfaces may be turned down without difficulty, but on the other hand they must be hard if they are to be efficient.

The object aimed at in the present invention is to provide a press-roller of composition-stone which shall be suitable for application in the printing of wall-paper and linoleum, and made in successive layers of different degrees of hardness, enabling the rough article to be easily turned down and the surface so prepared for use easily engraved and hardened, the core of the roller, which is not worked upon, being of a homogeneous composition.

The accompanying drawing shows a section of my press-roller.

The prepared composition-stone is made in three layers, *a, b* and *c*. The layer *a* is of a consistency enabling it to be turned down so as to bring the roller down to the exact diameter required The layer *b* is designed to be capable of being engraved and turned and *c* is the core around which the other layers are built. The stone-composition here used is an exact imitation of natural sandstone, in the composition of which the desired proportion of sawdust is mixed. The layer *c* is entirely free from this addition which is added only in the layer *b*, and in such a quantity as to suit this layer for turning. The layer *a* on the contrary may contain a large percentage of this admixture in order that the preparatory working may be carried out in the shortest possible time and with the least possible demand on the cutting tool. The layers *a* and *b* may however be homogeneous in character.

The stone composition of which the core *c* is made consists preferably of 75 parts sand; 10 parts magnesia; 7 parts casein, and 8 parts linseed oil or water glass. The layer *b* is composed of the same material and has mixed therewith a certain amount of sawdust. The layer *a* is composed of the same material and also comprises a certain amount of sawdust, which amount is preferably greater than the amount of sawdust employed in connection with the layer *b*.

When the roller has been reduced to the desired diameter by removal of the outer layer *a*, the layer *b* is exposed and can be worked upon as the material of which it is made is soft. As however the process of printing requires the hardest and most durable surface possible, the layer *b* is treated to a thin coating of some suitable glue-like matter, applied either by hand or by means of a roller, and then dusted over with porcelain or metal-powder. The roller is then laid in a furnace and the porcelain melted firmly onto its surface, when it is taken out and allowed to cool, after which it can be used for printing with admirable results. During the heating of the roller in the furnace, the sawdust adjacent the surface will, of course, char, thus forming spaces in the outer layer of the roller within which the molten porcelain may enter. Should it be desired to renew the design, the hard surface is melted off again in the furnace, a part of the layer *b* is turned away and the new design is engraved and fixed as before. The core *c* which bears the chief part of the pressure, is not subjected to any minute operations.

The hardening process described above may of course also be used for press-rollers of homogeneous composition-stone.

What I claim and desire to secure by Letters Patent of the United States is:—

1. A method of manufacturing printing rollers which consists in providing a cylindrical core, placing thereon a layer of softer material than the material of which the core is made, turning down the outer layer until the roll attains the desired diameter, providing the outer surface with a suitable pattern, and finally hardening said outer surface.

2. A method of manufacturing printing rollers which consists in providing a cylindrical core, placing thereon a layer of softer material than the material of which the core is made, turning down the outer layer until the roll attains the desired diameter, providing the outer surface with a suitable pattern, and finally providing the outer surface with a covering of hard material.

3. A method of manufacturing printing rollers which consists in providing a cylindrical core, placing thereon a layer of material comprising a substance adapted to char when subjected to heat, turning down the outer layer until the roll attains the desired diameter, providing the outer surface with a suitable pattern, placing on said surface a coating of fusible material, subjecting the roll to heat, whereby the coating material will fuse and the substance in the layer will char, thus permitting the fusible material to enter the space formerly occupied by such substance, and finally cooling the roll and allowing the fusible material to harden.

4. A method of manufacturing printing rolls, which consists in providing a cylindrical core, placing thereon a layer of material, comprising sawdust, turning down the outer layer until the roll attains the desired diameter, providing the outer surface with a suitable pattern, placing on said surface a coating of fusible material, subjecting the roll to heat whereby the coating material will fuse and the sawdust in the outer layer will char, thus permitting the fusible material to enter the space formerly occupied by the sawdust, and finally cooling the roll and allowing the fusible material to harden.

In testimony whereof I have signed my name to this specification in the presence of two subscribing witnesses.

CARL JAEK.

Witnesses:
WOLDEMAR HAUPT,
HENRY HASPER.